United States Patent Office 2,756,176
Patented July 24, 1956

2,756,176

RINDERPEST ADJUVANT VACCINE

Fred D. Maurer, Pullman, Wash., and Donald E. De Tray, Berwyn Heights, College Park, Kenneth L. Kuttler, Chevy Chase, and Alfred M. Webb, Frederick, Md., assignors to the United States of America as represented by the Secretary of the Army No Drawing. Application January 21, 1954,
Serial No. 405,522

11 Claims. (Cl. 167—78)

(Granted under Title 35, U. S. Code (1952), sec. 266)

The invention described herein may be manufactured and used by or for the Government of the United States of America for governmental purposes without the payment to us of any royalty thereon.

This invention relates to a rinderpest vaccine and methods for its production.

Rinderpest is an acute, highly infectious disease to which ruminants such as cattle, sheep, and goats are susceptible. Rabbits may also be infected by certain strains of the virus. The disease is caused by a filterable virus which produces a diphtheric inflammation of the mucous membranes especially of the intestines. The spleens, lungs, and other tissues of the infected cattle are found to contain high concentrations of the virus.

The present invention relates to a vaccine to be administered to the animals prior to infection. This vaccine has proved to be extremely effective in preventing contagion from an infected animal to a vaccinated animal and in preventing infection even when vaccinated animals are injected with large doses of virus.

The vaccine is composed of rinderpest-infected tissue which has been treated chemically in a manner which appears to render it non-infective, together with a small amount of cells of a material derived from a mycobacteria such as *Mycobacterium butyricum*. These are emulsified in an oil to produce the vaccine.

Active virus tissue was obtained by injecting susceptible cattle subcutaneously with 10 to 100,000 minimal infective doses (MID) of rinderpest virus, Old Kabete (OK) strain. Injected cattle usually responded with a temperature of 104° F. or higher on the 3rd morning after injection. On the next morning the 2nd morning of temperature above 104° F.) the animals were sacrificed by shooting and the spleens removed in an aseptic manner within half an hour. These spleens were sometimes used immediately but frequently were held for some days at about —25° C. The fresh or thawed spleen was cut into strips and ground in a Latapie grinder. To a weighed amount of ground tissue was added 40% by volume of cold 9% aqueous solution of sodium chloride. The suspension was thoroughly stirred and stored at 5° C. for about 18 hours. Then cold distilled water was added in sufficient amount to make the resulting mixture a 0.9% solution of sodium chloride (i. e. 9 volumes of distilled water to 1 volume of 9% sodium chloride). This suspension was now essentially 20% spleen tissue in 0.9% sodium chloride. It was passed through an 18-mesh screen and the volume of material passing the screen was measured. From 0.5% to 1% by volume of formalin U. S. P. (commercial solution containing 37 to 40% formaldehyde) was added. The formalinized suspension was held in a closed vessel at about 5° C. for at least 72 hours and was mixed thoroughly twice a day. The suspension could be stored in this fashion for several weeks without apparent harm. This treatment renders the virus non-infective in the sense that it becomes incapable of producing observable symptoms of disease in cattle but allows it to retain its ability to produce antibodies. Whereas spleens were used in this preparation, it is to be understood that other tissues which contain a sufficient concentration of the virus, such as lung and lymph gland, can be used.

The cell material used in the vaccine was the heat killed cells of *Mycobacterium butyricum* of an American Type Culture Collection strain 362, and were produced by growing the strain in stationary flasks containing a shallow layer of meat infusion broth. These cultures were incubated at about 37° C. from 5 to 7 days. The growth, which was mostly in the form of a pellicle, was collected and washed several times in distilled water by centrifugation. After washing, the cells were suspended in a small amount of distilled water and killed by heating in a boiling water bath for one hour. The cells of mycobacterium enhance the antigenicity of the vaccine. Other species of mycobacteria have similar properties.

The oil used in preparing the vaccine was a mineral oil having a specific gravity 0.809 at 60° F., Saybolt viscosity 90 at 100° F. Another heavier mineral oil has also been used having a specific gravity 0.886 at 60° F., Saybolt viscosity 344 at 100° F. Other water-non-miscible substances which are non-toxic to animals could be used. This would include vegetable oils such as peanut and sesame oil.

The emulsifier used was mannide mono-oleate or Lanolin USP. In the case of the latter, 15% was used instead of 5% for the mannide mono-oleate, and the spleen suspension and the mineral oil were each reduced by 5%. It is understood, however, that any suitable non-toxic emulsifier which is capable of rendering the emulsion stable over extended periods of time may be used.

The vaccine was prepared from the above ingredients by weighing the required small amount of killed cells of *Mycobacterium butyricum* and grinding these in a mortar with a small portion of the required volume of mineral oil. This concentrated suspension of bacteria in oil was then mixed thoroughly with the remainder of the oil. The oil-bacterial mixture was kept at about 40° C. and continuously stirred while the emulsifier was added. These stirrings were done with a high speed mixer of the Waring blendor type or in a colloid mill of the Eppenbach type.

The required volume of formalinized spleen suspension was warmed to 35° C.–40° C. and added slowly and with continuous high speed stirring to the adjuvant mixture (mineral oil-emulsifier-*Mycobacterium butyricum*) at 40° C.

The resulting emulsion was the adjuvant vaccine ready for injection of cattle. It was a creamy, smooth flowing, oily mixture of uniform appearance which did not separate upon standing at 37° C. for about a week.

The components of the adjuvant mixture were bacteriologically sterile and the process of combination to make the adjuvant vaccine was carried out aseptically. The completed vaccine contained about 50% virus material, 45% mineral oil, 5% emulsifier, and 1–2 mgm. % dried *Mycobacterium butyricum*. The exact proportion of these compositions is not critical provided that a stable emulsion is obtained.

The effectiveness of the vaccine was tested by inoculating cattle either subcutaneously or intramuscularly. Seventeen consecutive lots of anti-rinderpest adjuvant vaccine using lanolin or mannide mono-oleate as an emulsifier have been prepared. These lots were tested for their ability to immunize by injecting groups of cattle subcutaneously or intramuscularly with 2.0 to 5.0 ml. of vaccine. The cattle were challenged 14 to 253 days later by injecting subcutaneously 1000 to over 100,000 MID of virulent rinderpest virus. In order to detect an infection the challenged cattle were carefully observed and their temperatures measured morning and evening.

Only one lot of vaccine failed to confer immunity, the reasons for this failure are unknown and the results with it are not included in the following summary. Of 141 cattle used in the above tests 138 (98%) were solidly immune and developed no signs of reaction to the challenge. The 3 reacting animals belonged to one group challenged 121 days after vaccination and showed 2 to 3 days of elevated temperatures without any other clinical signs of disease. A group of nine animals challenged at 253 days showed no signs of illness.

The vaccines used in the above tests were generally stored for a few weeks to a few months at 4° C., but other storage conditions have included −30° C. for 7 months, 4° C. for up to 221 days, 4° C. for 63 days followed by 21° C. for 16 days followed by 4° C. for 47 days.

We claim:

1. A vaccine comprising rinderpest virus material which has been rendered non-infective by chemical means, cell material derived from *Mycobacterium butyricum*, a water-non-miscible substance, and an emulsifier.

2. A vaccine in accordance with claim 1 wherein the water-non-miscible substance is an oil.

3. A vaccine comprising rinderpest virus material which has been rendered non-infective by chemical means, killed cells of *Mycobacterium butyricum*, a mineral oil, and an emulsifier.

4. A rinderpest vaccine comprising tissue from rinderpest-infected cattle in which the virus has been rendered non-infective by chemical means, killed cells of *Mycobacterium butyricum*, a mineral oil, and a non-toxic emulsifier.

5. A rinderpest vaccine in accordance with claim 4 in which the emulsifier is lanolin.

6. A rinderpest vaccine in accordance with claim 4 wherein the emulsifier is mannide mono-oleate.

7. A rinderpest vaccine in accordance with claim 4 wherein the tissue is finely ground spleen.

8. A method of producing a rinderpest vaccine which comprises emulsifying a small amount of dried, killed cells of *Mycobacterium butyricum* and an amount of non-infective rinderpest virus material in a mineral oil.

9. A method of preparing a rinderpest vaccine which comprises treating a tissue from rinderpest-infected cattle to render the same non-infective by chemical means and emulsifying said material with a small amount of dried, killed cells of *Mycobacterium butyricum* in a mineral oil.

10. A method in accordance with claim 8 wherein the tissue is rendered non-infective by mixing with a solution of formaldehyde.

11. A method of preparing a rinderpest vaccine wherein the spleen of rinderpest-infected cattle is finely ground and mixed with an aqueous solution of sodium chloride and formaldehyde after which the suspension is emulsified in mineral oil together with an amount of dried, heat-killed cells of *Mycobacterium butyricum*.

References Cited in the file of this patent

Pathology and Therapeutics of Diseases of Domestic Animals by F. Hutyra, J. Marek and R. Manninger, 4th edition, volume I (1938), pages 276–279. (Copy in Div. 43.)

Zinsser's Textbook of Bacteriology, revised by D. T. Smith et al., 9th edition, Appleton-Century-Crafts, Inc., New York (1948), pages 808, 377. (Copy in Scientific Library.)